United States Patent [19]
Boie

[11] Patent Number: 5,831,689
[45] Date of Patent: Nov. 3, 1998

[54] METHOD OF DIGITIZATION OF INTERMEDIATE FREQUENCY VIDEO SIGNALS AND DEVICE FOR IMPLEMENTATION OF THE METHOD

[75] Inventor: Werner Boie, Brigachtal, Germany

[73] Assignee: Thomson multimedia S.A., Courbevoie, France

[21] Appl. No.: 649,741

[22] Filed: May 14, 1996

[30] Foreign Application Priority Data

Jun. 12, 1995 [FR] France ................................. 95 06904

[51] Int. Cl.⁶ .............................. H04N 5/44; H04N 5/445
[52] U.S. Cl. ........................ 348/725; 348/572; 348/731
[58] Field of Search ................................. 348/639, 641, 348/725–727, 731, 732, 572, 573; H04N 5/44, 5/445

[56] References Cited

U.S. PATENT DOCUMENTS 4,502,078 2/1985 Steckler et al. ......................... 358/188

FOREIGN PATENT DOCUMENTS

| 0062872 | 10/1982 | European Pat. Off. .......... H04B 1/30 |
| 0321681 | 6/1989 | European Pat. Off. ......... H04N 5/44 |
| 0442578 | 8/1991 | European Pat. Off. ......... H04N 5/44 |
| 0629040 | 12/1994 | European Pat. Off. ......... H03D 1/22 |
| 88/10548 | 12/1988 | WIPO .............................. H04B 1/16 |

*Primary Examiner*—Glenton B. Burgess
*Attorney, Agent, or Firm*—Joseph S. Tripoli; Frederick A. Wein

[57] ABSTRACT

A method for digitizing intermediate frequency (IF) video signals, of acceptable cost, in which the signal from a tuning device is pre-filtered and amplified. This pre-processed signal is fed to a sample and hold circuit whose bandwidth covers the range up to at least the maximum intermediate frequency, and the sampled signals output from the sample and hold circuit are fed to an analog-to-digital converter whose dynamic resolution is sufficient only up to about half of the sampling frequency. The invention is applicable to the processing of digital IF video signals.

9 Claims, 2 Drawing Sheets

METHOD OF DIGITIZATION OF INTERMEDIATE FREQUENCY VIDEO SIGNALS AND DEVICE FOR IMPLEMENTATION OF THE METHOD

BACKGROUND-OF THE INVENTION

The invention relates to a method of digitization of intermediate frequency (IF) video signals.

DESCRIPTION OF THE PRIOR ART

It is increasing common to digitize signals of all sorts in TV installations. The reasons are many, the overriding one being that the techniques for processing, filtering and demodulating digital signals are generally more flexible and less costly than analog solutions.

The digitization of signals in the tuning device or the IF circuit today poses serious problems. One major difficulty is that the performance of analog-to-digital converters (ADC) available on the market at an acceptable price is insufficient, notably as regards bandwidth and dynamic resolution.

SUMMARY OF THE INVENTION

The main purpose of the invention is to propose a method of digitization of IF video signals that uses components of reasonable price and that provides more satisfactory results, notably as regards the bandwidth and dynamic resolution.

The invention is therefore a method for digitizing IF video signals output from a tuning device, in which:

the signal from a tuning device is pre-filtered and amplified;

this pre-processed signal is fed to a sample and hold circuit whose bandwidth covers the range up to at least the maximum intermediate frequency, the sampled signals output from said sample and hold circuit are fed to an analog-to-digital converter whose dynamic resolution is sufficient only up to about half of the sampling frequency.

The ADC according to the invention essentially plays the role of a quantifier and can work at a lower frequency. The sample and hold circuit, distinct from the ADC, is designed to follow very rapidly the signal at the input and conserve the amplitude at the output, to enable good quantification by the ADC.

In other words, said sample and hold circuit functions in such a manner as to reduce to the minimum, or even eliminate, any alteration of the output signal relative to the input signal.

The pass-band of the sample and hold circuit preferably has an upper limit higher than the maximum intermediate frequency.

The sampling frequency common to the sample and hold circuit and the ADC is advantageously less than the highest intermediate frequency.

The sampling frequency is preferably between two thirds of the maximum intermediate frequency and the difference between this maximum intermediate frequency and the bandwidth of the BCH channel. More generally, the sampling frequency is chosen so as to ensure cover of the frequency spectrum after sampling, so as to occupy as little frequency space as possible, while avoiding the phenomenon known as "aliasing".

The invention also relates to a device that implements the method according to the invention. This device includes a pre-filtering circuit whose output is connected to an amplifier, advantageously with automatic gain control, the output of this amplifier being connected to the input of a sample and hold circuit, whose output is connected to the input of an ADC, the sampling frequency being applied in common to the sample and hold circuit and to the ADC.

The pre-filtering circuit is preferably a surface acoustic wave (SAW) filter.

BRIEF DESCRIPTION OF THE DRAWINGS

The invention will be better understood and other advantages and characteristics will become clear on reading the following description of an embodiment, taken only as a non-limitative example, making reference to the appended figures, of which:

FIG. 1 shows a circuit for the digitization of IF video signals. In order to reduce the necessary dynamic range of the IF signal to be digitized, which is fed from the output of a tuning device (referred to simply a the "tuner" in the description that follows) via a connection 1, this output signal undergoes pre-filtering by a filter 2, which is advantageously a SAW filter.

Figure 2A:
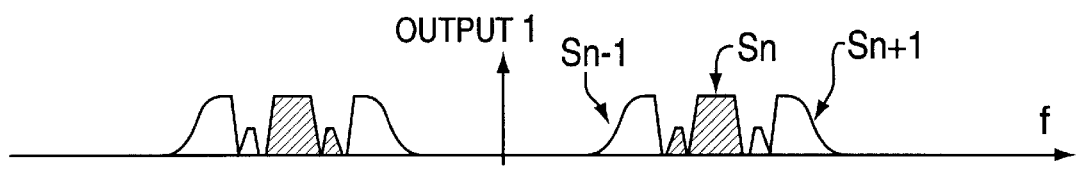
FIG. 2A is a diagram representing the output signals of a tuning device.

The FIG. 2A shows the output signal of the tuner, with frequencies as abscissas and amplitudes as ordinates,. This signal includes the signal Sn, whose zones are hatched, corresponding to the video channel sought, and signals of adjacent channels represented and designated by Sn+1 and Sn−1. The signal is symmetric about the vertical axis, with a part that corresponds to negative frequencies in the mathematical representation.

Figure 2B:
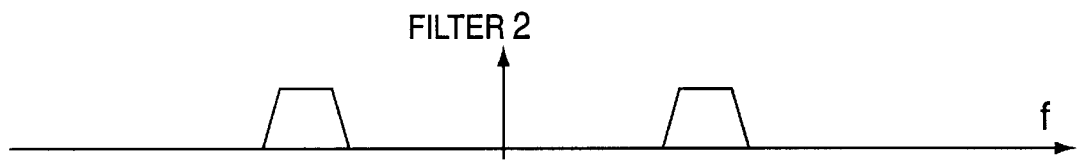
FIG. 2B is a diagram of the pass-band of the filter performing the pre-filtering.

FIG. 2B illustrates the pass-band of filter 2 that performs the pre-filtering; the horizontal axis is the frequency and the vertical axis is the transmission coefficient of the filter. The pass-band corresponds to the required channel.

Figure 2C:
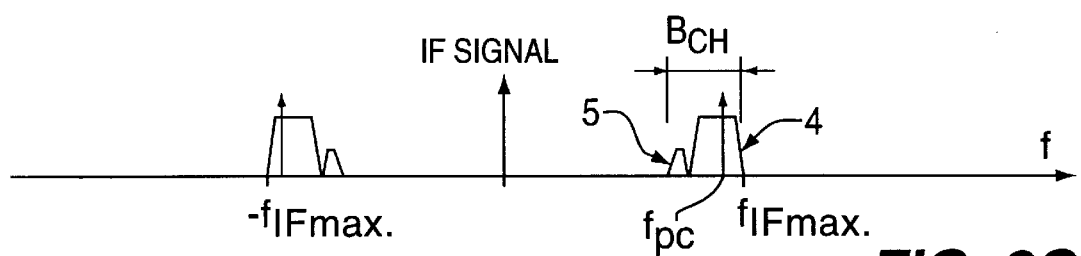
FIG. 2C is a diagram of the signal after the pre-filtering.

FIG. 2C shows the signal at the output 3 of the filter 2. The signals of the adjacent channels Sn−1, Sn+1 have been eliminated. Only the signal Sn remains, having the bandwidth BCH of the channel considered. The signal Sn is shown by a trapezoidal envelope 4, corresponding to the video band around the frequency fpc of the image carrier, and a sound band 5, that is narrower and situated in the example considered just beneath the lower limit of the band 4, for positive frequencies; the positions are inversed in the negative frequency domain. The upper limit of the band 4 corresponds to the maximum frequency $f_{IFmax}$ of the IF spectrum.

Figure 1:
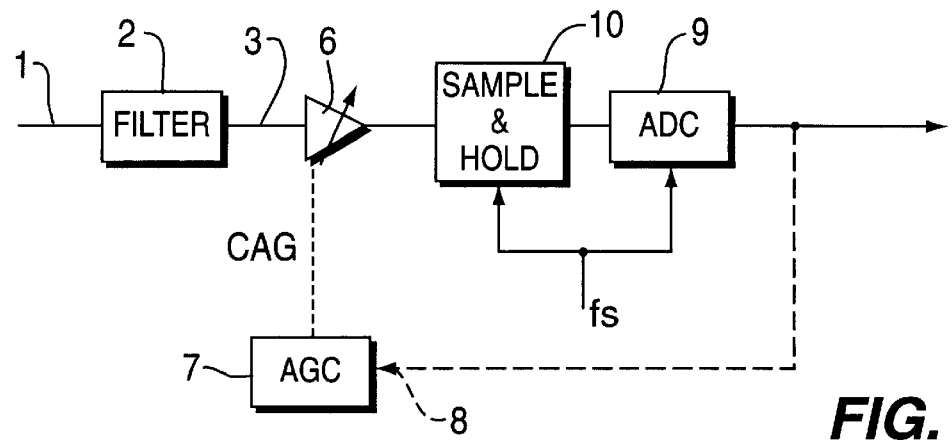
FIG. 1 is a block diagram showing a device for digitization of IF video signals.

Returning to FIG. 1, we see that the output 3 of filter 2 is connected to the input of an amplifier 6 preferably having an automatic gain control (AGC) circuit 7. In our example the AGC circuit 7 receives on its input 8 the output signal from an ADC 9. In a variant of this circuit, the AGC circuit 7 could receive on its input 8 an output signal processed in a digital signal processing block not shown in FIG. 1. The AGC circuit ensures that the amplitude of the signal fed to the ADC 9 is within the acceptable limits for this converter.

The signal output by the amplifier 6 is fed to the input of a sample and hold circuit 10 distinct from the ADC 9. The separation of the sample and hold circuit 10 and the ADC 9 enables the different frequency requirements of the circuits 9 and 10 to be satisfied.

The bandwidth of the sample and hold circuit 10 reaches at least the maximum intermediate frequency IF to be digitized, or can even be greater than this maximum frequency in order to avoid any supplementary effects of non-linearity.

The ADC 9 located after the sample and hold circuit 10 must have sufficient dynamic resolution only up to half of the sampling frequency, and this can be different from the requirement for the sample and hold circuit 10 when under-sampling is carried out.

The sample and hold circuit 10 is included not only to provide a sufficient bandwidth, as defined previously, but also to ensure adequate performance and to follow the signal at the input, arriving from the amplifier 6, at constant level, and to keep the amplitude of the sampled/blocked signals constant at the output of the circuit 10. These conditions are necessary in order that the ADC 9, consisting essentially of a quantifier, outputs a digital signal that corresponds perfectly to the analog signal delivered to the input of the circuit 10.

In practice, the quantifiers of commercially-available ADCs have characteristics that are quite sufficient to provide good results, provided the sampled signals fed to the input of these converters are correct, with a reduced sampling frequency.

The sampling of the signal video IF is carried out using an under-sampling technique at a relatively low frequency, which less than the generally recommended sampling frequency and is twice the maximum frequency IF.

First, we shall consider a sampling frequency $f_S$ that is equal to the highest intermediate frequency $f_{IFmax}$. The periodic spectrum due to the sampling process depends on the sampling frequency $f_S$ and more precisely on the difference between the sum of this sampling frequency $f_S$ and the signal frequencies of the channel.

Figure 3A:
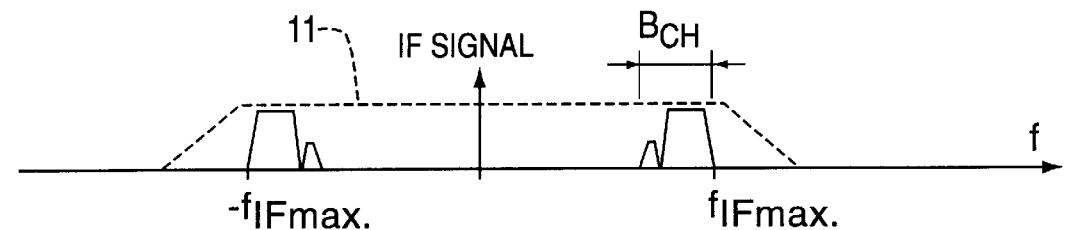
FIG. 3A is the same as FIG. 2C, but showing in addition the bandwidth required for the sample and hold circuit.

FIG. 3A shows the signals of FIG. 2C output by the filter 2; in addition, the pass-band 11 of the sample and hold circuit 10 is shown by a dashed line. The upper limit of this pass-band 11 is greater than the maximum intermediate frequency of the signals considered.

Figure 3B:
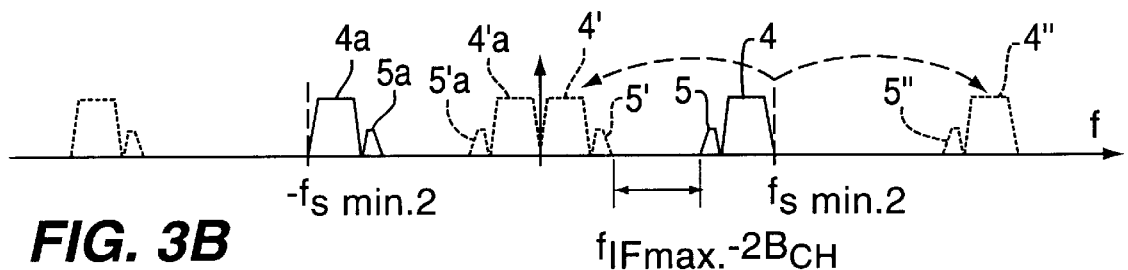
FIG. 3B is a diagram illustrating the effects of the sampling on the signal of FIG. 3A at a sampling frequency of fSmin.2.

At a sampling frequency of $f_{Smin}.2$ equal to the maximum frequency $f_{IFmax}$, we obtain a spectrum, after sampling, like the one shown in FIG. 3B. From the difference between the sampling frequency and the frequency of the signals of the bands 4 and 5, we obtain the spectra 4' and 5' represented by dashed lines. The lower limit of the band 4' corresponds more or less to the origin of the frequency axis. By adding the sampling frequency $f_S$ and the frequency of the signals of bands 4 and 5 we obtain the bands 4" and 5", also shown as dashed lines.

On the negative frequency side, we obtain a similar phenomenon that is symmetric about the vertical axis. We see that the upper limit of the band 4'a also corresponds more or less to the origin of the frequency origin. However, the bands 4' and 4'a do not overlap (which would lead to the parasitic phenomenon known as "aliasing"). It is clear that for a sampling frequency a little lower than $f_{IFmax}$, this overlapping will occur and aliasing will arise since the lower limit of the band 4' then falls beyond the frequency origin, on the negative frequency side, and inversely for the upper limit of the band 4'a.

This shows that the reduction of the sampling frequency is subject to certain limits if we are to avoid alteration of the resulting signal.

Figure 3C:
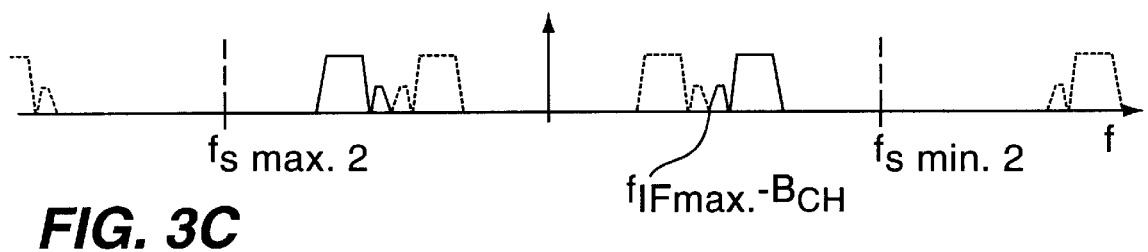
FIG. 3C is a diagram illustrating the effects of the sampling on the signal of FIG. 3A at another sampling frequency fSmax.2.

Moreover, the sampling frequency can not be increased arbitrarily. FIG. 3C illustrates the limit of this increase that is reached when the sampling frequency becomes equal to the difference between twice the maximum intermediate frequency and twice the bandwidth of the BCH channel, i.e. when $f_{Smax}.2=2 (f_{IFmax}-BCH)$.

Consequently, the sampling frequency $f_S$, chosen to be less than the frequency generally recommended, can range between the limits defined by $f_{IFmax}<f_S<2(f_{IFmax}-BCH)$.

For a 8 MHz channel, in a standard PAL B/G, the sampling frequency $f_S$ is constrained between 40.4 MHz and 64.8 MHz (40.4 MHz<$f_S$ <64.8 MHz).

However, in FIGS. 3B and 3C illustrating the spectra obtained with sampling frequencies respectively equal to the lower limit and the upper limits mentioned previously, we see that the occupation of the frequencies by the spectrum is not optimal, since unoccupied intervals remain between the bands.

Figure 4A:
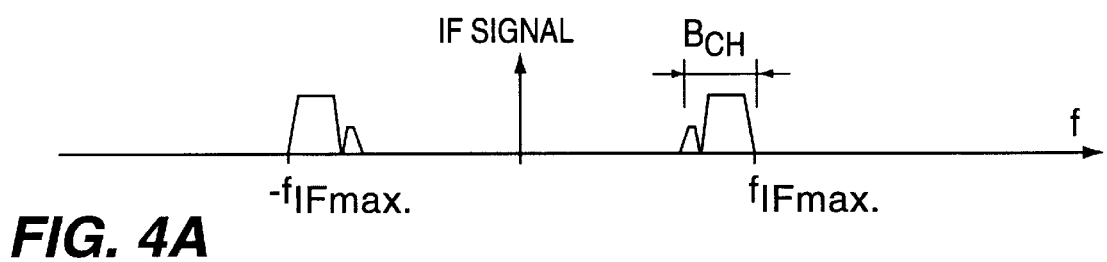
FIG. 4A is a diagram similar to that of FIG. 2C illustrating the IF signal after pre-filtering.
Figure 4B:
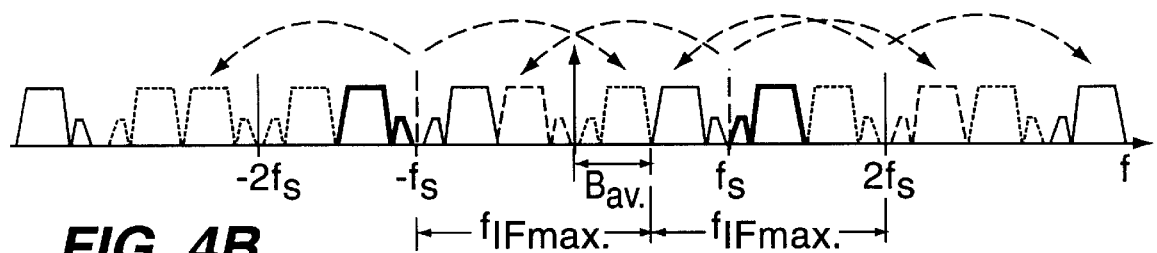
FIG. 4B is a diagram illustrating the effects of the sampling at a frequency fS ensuring an optimal occupation of the spectrum.
Figure 4C:
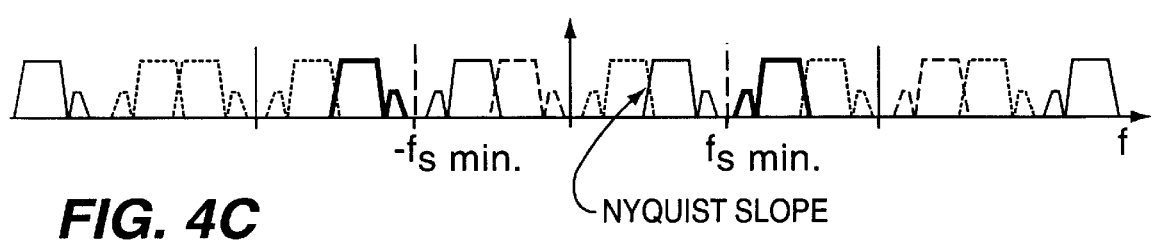
FIG. 4C is a diagram similar to that of FIG. 4B for a different sampling frequency.

In order to better cover the spectrum after sampling, and to occupy less frequency space, we can choose a sampling frequency $f_S$ less than the minimum intermediate frequency, or less than the maximum intermediate frequency minus the bandwidth of the channel, as shown in FIG. 4B. The sampling frequency can be advantageously reduced to the value equal to $\frac{2}{3}$ of the maximum frequency $f_{IFmax}$. The maximum bandwidth $B_{av}$ of the signal to be sampled can then be as much as one third of the maximum intermediate frequency:

$$B_{max}=B_{av}=f_{IFmax}/3.$$

In this case, the spectrum after sampling is filled by juxtaposition of the bands without unused intervals—and without overlapping of these bands.

This approach corresponds to an under-sampling at a frequency less than that generally recommended. This lowered frequency enables the signals to be digitized satisfactorily using a reasonably-priced, commercially-available ADC.

The sampling frequency $f_S$ can therefore range between the limits $2f_{IFmax}/3$ and $f_{IFmax}-B_{CH}(2f_{IFmax}/3<f_S<f_{IFmax}-B_{CH})$.

The corresponding available bandwidth Bav then lies between $f_{IFmax}/3$ and BCH ($f_{IFmax}/3<B_{av}<B_{CH}$).

In the case of multi-standard reception for which the bandwidth of the channel must be maintained variable, the minimum sampling frequency must be chosen since it will offer the maximum bandwidth which, for a maximum intermediate frequency $f_{IFmax}$=40.4 MHz gives:

$$B_{max}=40.4 13=13.466 \text{ MHz},$$

for a PAL B/G standard (corresponding to a certain TV standard).

The sampling frequency then becomes:

$$f_S=\tfrac{2}{3}f_{IFmax}=\tfrac{2}{3}\times40.4 \text{ MHz}=26.933 \text{ MHz}.$$

If we accept a small degree of "aliasing" in the remaining sideband, the sampling frequency can be reduced by half of the width of the remaining sideband. For the PAL B/G standard considered, for which this sideband has a width of 1.25 MHz, we obtain a minimum sampling frequency of:

$$f_{Smin}=26.933 \text{ MHz}-(1.25/2)=26.308 \text{ MHz}.$$

Figure 5:
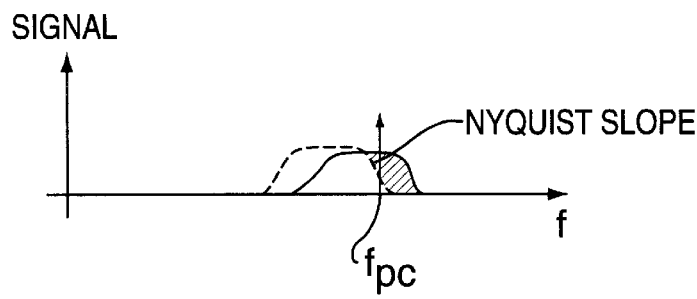
FIG. 5 is a diagram illustrating a Nyquist slope.

Advantageously, the filter 2 (FIG. 1) performing the pre-filtering also performs a Nyquist slope as shown in FIG. 5. The purpose of this Nyquist slope is to eliminate the hatched part of the remaining sideband situated beyond the frequency of the video carrier fpc. This avoids parasites during demodulation and later processing of the signal. In this case, instead of using the maximum intermediate frequency in the formulas given previously, we use the Nyquist frequency (frequency of the video carrier), which, in the example of the PAL B/G standard, gives an even lower minimum sampling frequency, $f_{Smin}$=25.933 MHz.

Generally speaking, we can say that the minimum sampling frequency depends on the maximum intermediate frequency and the bandwidth of the channel of the TV standard considered. If the maximum bandwidth of channel is limited to about 8 MHz, this would imply that reception of the MAC or HD MAC standards can be excluded, the classical intermediate frequency IF can be reduced from the value:

$f_{IFvision}$ = 38.9 MHz (B/G)
to
$\quad f_{IFvision}$ = 3 $B_{max}$ - (width of the remaining sideband)
$\quad\quad\quad$ = 24 MHz - 1.25 MHz = 22.75 MHz.

The necessary minimum sampling frequency then becomes:

$$f_{Smin}=2B_{max}=16 \text{ MHz}.$$

At this stage, however, we might ask whether a pre-filtering filter 2, such as a SAW filter, can be provided while assuring the same performance at a lower intermediate frequency.

The method of under-sampling of a video signal at an intermediate frequency, according to the invention, with a sampling frequency of about 27 MHz, less than that generally recommended, enables an inexpensive multi-standard analog-to-digital conversion with the IF circuit. Although the sample and hold circuit preceding the ADC must satisfy relatively stringent criteria, this solution is still advantageous from a cost point of view.

What is claimed is:

1. Method for digitizing intermediate frequency video signals, comprising the steps of:
   pre-filtering and amplifying a signal from a tuning device;
   sampling and holding the pre-filtered and amplified signal, the sample and hold circuit having a bandwidth which covers a range of up to at least the maximum intermediate frequency, and
   analog-to-digital converting of the sampled signals outputted from said sample and hold circuit in an analog-to-digital converter whose dynamic resolution is sufficient only up to about half of the sampling frequency, the sampling frequency common to the sample and hold circuit and to the analog-to-digital converter being less than the highest intermediate frequency.

2. Method of digitization according to claim 1, wherein said sample and hold circuit reduces to a minimum, or even eliminate, any alteration of the output signal relative to the input signal.

3. Method of digitization according to claim 1, wherein said sample and hold circuit has a pass-band having an upper limit higher than the maximum intermediate frequency.

4. Method of digitization according to claim 1, wherein the sampling frequency is between ⅔ of the maximum intermediate frequency and the difference between this maximum intermediate frequency and the bandwidth of the channel.

5. Method of digitization according to claim 1, wherein the sampling frequency is chosen to provide the filling of the spectrum after sampling while occupying a minimum amount of frequency space, thus avoiding the phenomenon of "aliasing".

6. Method of digitization according to claim 1 wherein said sample and hold circuit maintains the amplitude of the sampled signal for a sufficiently long period to enable satisfactory quantification by said analog-to-digital converter.

7. Device for digitizing intermediate frequency video signals comprising:
   a pre-filtering circuit that receives signals from a tuning device and eliminates the signals of channels adjacent to the channel sought, and
   a sample and hold circuit that receives said pre-filtered signals and whose output is coupled to an analog-to-digital converter that quantifies the sampled signals,
   the sample and hold circuit having a bandwidth which covers a range of up to at least the maximum intermediate frequency,
   the analog-to-digital converter having a dynamic resolution sufficient only up to about half of the sampling frequency, the sampling frequency common to the sample and hold circuit and the analog-to-digital converter being less than the highest intermediate frequency.

8. Device according to claim 7, further comprising an automatic gain control amplifier, coupled between the output of said pre-filtering circuit and the input of said sample and hold circuit.

9. Device according to claim 7, wherein said pre-filtering circuit is a surface acoustic wave (SAW) filter.

* * * * *